United States Patent
Yardumian et al.

(10) Patent No.: US 6,754,728 B1
(45) Date of Patent: Jun. 22, 2004

(54) SYSTEM AND METHOD FOR AGGREGATING SHELF IDS IN A FIBRE CHANNEL STORAGE LOOP

(75) Inventors: Edward H. Yardumian, Round Rock, TX (US); Bharath V. Vasudevan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/365,285

(22) Filed: Feb. 12, 2003

(51) Int. Cl.[7] .............................................. G06F 13/14
(52) U.S. Cl. ............................. 710/9; 710/3; 709/727; 711/111; 711/114; 369/30; 385/135
(58) Field of Search .......................... 710/3, 9; 711/111, 711/114; 369/30; 709/727; 385/135

(56) References Cited

U.S. PATENT DOCUMENTS

| | | | |
|---|---|---|---|
| 5,408,571 A | 4/1995 | Kaplan | 385/135 |
| 5,812,754 A | 9/1998 | Lui et al. | 395/182.04 |
| 6,000,020 A | 12/1999 | Chin et al. | 711/162 |
| 6,118,331 A | 9/2000 | Yunus et al. | 327/553 |
| 6,151,331 A | 11/2000 | Wilson | 370/465 |
| 6,167,463 A * | 12/2000 | Arp et al. | 710/9 |
| 6,199,112 B1 | 3/2001 | Wilson | 709/227 |
| 6,366,982 B1 * | 4/2002 | Suzuki et al. | 711/114 |
| 6,470,007 B1 | 10/2002 | Berman | 370/351 |
| 6,477,139 B1 * | 11/2002 | Anderson et al. | 370/216 |
| 6,694,317 B1 * | 2/2004 | Stakutis et al. | 707/10 |

\* cited by examiner

*Primary Examiner*—A. Elamin
(74) *Attorney, Agent, or Firm*—Baker Botts L.L.P.

(57) ABSTRACT

A modular fiber channel information handling system includes a storage processor and multiple associated fiber channel data storage enclosures. The storage processor and the fiber channel data storage enclosures are connected by a fiber channel storage loop. The storage processor includes an identification engine operable to assign device addresses to the associated storage devices and an aggregation engine that is able to selectively aggregate the shelf IDs of data storage enclosures that have been selected to be aggregated.

14 Claims, 2 Drawing Sheets

SYSTEM AND METHOD FOR AGGREGATING SHELF IDS IN A FIBRE CHANNEL STORAGE LOOP

TECHNICAL FIELD

The following invention relates in general to information storage systems and in particular to aggregating shelf IDs in a fiber channel storage loop.

BACKGROUND

As the value and use of information continues to increase, individuals and businesses seek additional ways to process and store information. One option available to users is information handling systems. An information handling system generally processes, compiles, stores, and/or communicates in formation or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Fiber Channel or FC systems are a particular type of information handling system. Fiber Channel is an integrated set of standards for flexible high-speed serial data transfer. A particular topology is a Fiber Channel Arbitrated Loop (FC-AL) (which may also be referred to herein as a Fiber Channel Loop or FC Loop). Current Fiber Channel Loops may have multiple subsystems or enclosures (which may also be referred to as disk enclosures, or data storage modules) with up to 126 connected devices. Note, however, that many more devices may theoretically be attached to the Fiber Channel fabric.

Most fiber channel storage sub systems are so called disk enclosures, with disk drives divided across a number of chassis. These chassis are often connected to one another and then to storage processors. Because the disk drives are connected in a loop fashion, it is a requirement that each disk drive have a unique identifier. In current fiber channel storage systems, this identification is a combination of the disk drive ID within the chassis in conjunction with the so-called shelf ID of the chassis.

Current direct attached fiber channel sub systems allow for a maximum of eight shelf IDs with 16 devices per shelf ID. This results in up to 128 possible devices on a fiber channel storage loop. Of these 128 devices, two devices per shelf ID are typically claimed by SCSI protocol overhead, resulting in a maximum configuration of 112 physical drives connected to a single direct attached fiber channel sub system.

Each fiber channel enclosure, whether it is a traditional multi drive storage enclosure (such as the power vault 650F or power vault 660F sold by Dell Computer Corporation) or a modular data storage module, is assigned one of the possible eight unique shelf IDs. Since modular storage systems typically contain between three to six drives (considerably less than the maximum of 15 physical drives) the remainder of the drive IDs which could be assigned to the shelf ID will be forfeited, reducing the total number of physical drives that can be connected to the FC Arbitrated Loop. By reducing the total number of physical drives that can be connected to the FC-AL, the FC Loop is not fully utilized and may hamper the management of storage devices within the FC Loop.

SUMMARY

Therefore a need has arisen for a system and method for managing device shelf IDs in a fiber channel storage loop.

A further need has arisen for a system and method for aggregating shelf IDs in a fiber channel storage loop to maximize the number of devices connected to the fiber channel storage loop.

In accordance with teachings of the present disclosure a system and method are described for managing shelf IDs in a fiber channel storage loop that overcomes or eliminates problems associated with prior addressing methods.

In one aspect a modular fiber channel information handling system is disclosed that includes a storage processor, a storage processor, and multiple associated fiber channel data storage enclosures. The storage processor, storage processor, and the fiber channel data storage enclosures are connected by a fiber channel storage loop. The storage processor includes an identification engine operable to assign device addresses to the associated storage devices. The fiber channel data storage enclosures may include one or more modular data storage enclosures that have a fractional shelf width. The data storage enclosures include a shelf ID selector. The modular data storage enclosures, include an associated shelf ID selector and an aggregation selector. The storage processor also has an aggregation engine that is able to selectively aggregate the shelf IDs of data storage enclosures that have been selected to be aggregated. More particularly, the aggregation engine may check the status of the aggregation selector of each associated data storage module and may also determine whether an aggregation error condition exists.

In another aspect, a method for aggregating shelf IDs of data storage modules of a fiber channel storage loop includes providing multiple data storage modules where each data storage module includes an aggregation selector. The method also includes providing a storage processor that has an identification engine and an aggregation engine and associating the storage processor and the storage modules via a fiber channel storage loop.

The present disclosure includes a number of important technical advantages. One technical advantage is providing a storage processor that includes an aggregation control module. The aggregation control module advantageously allows the device and shelf IDs of associated data storage modules to be managed. Another important technical advantage is providing an aggregation selector on each data storage module. Providing the aggregation selector allows each data storage module to be selected for aggregation. Additional advantages are described in the figures, description and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
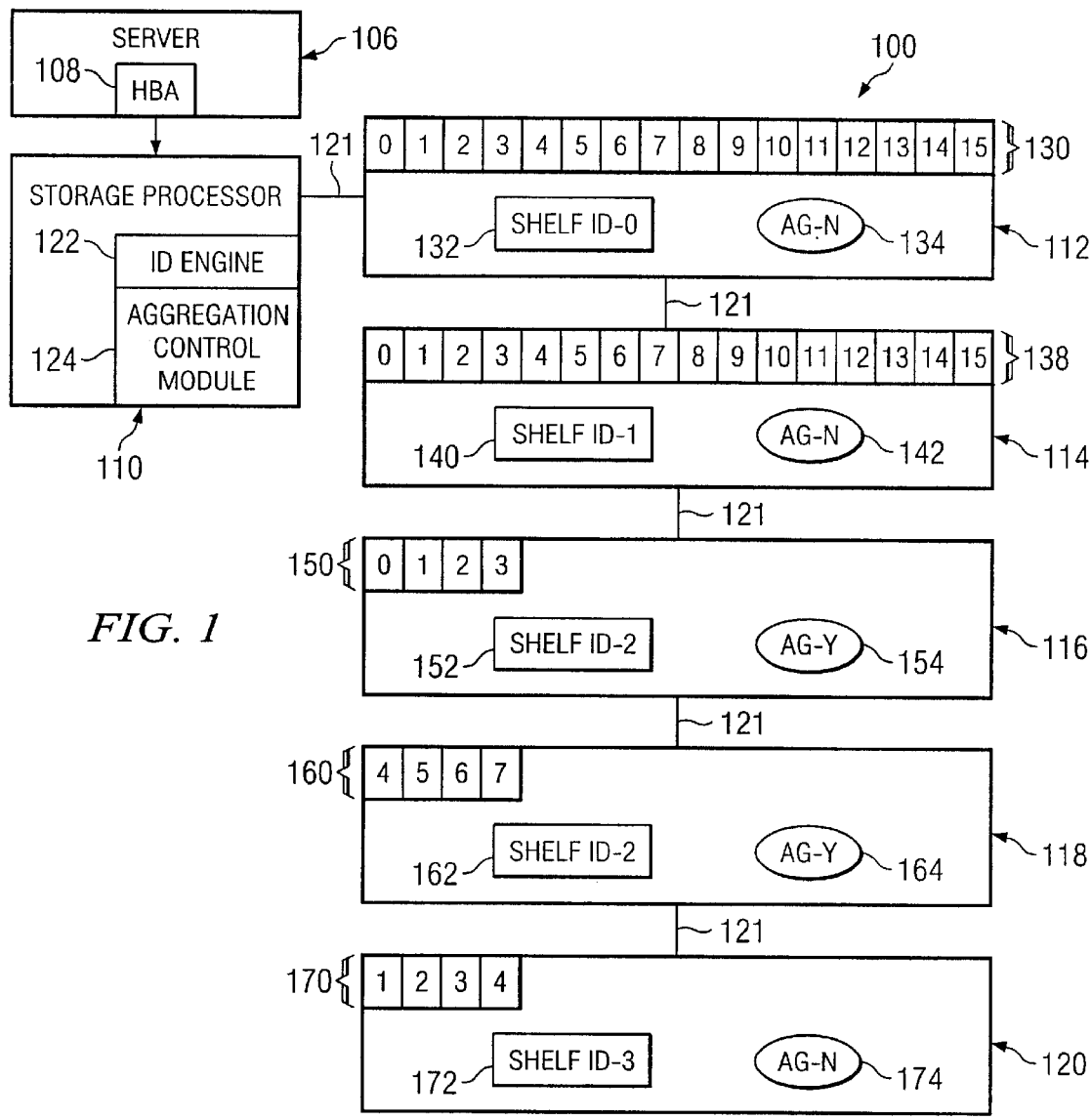
FIG. 1 is a fiber channel communications system with a server, a storage processor and a plurality of data storage enclosures according to teachings of the present invention.
Figure 2:
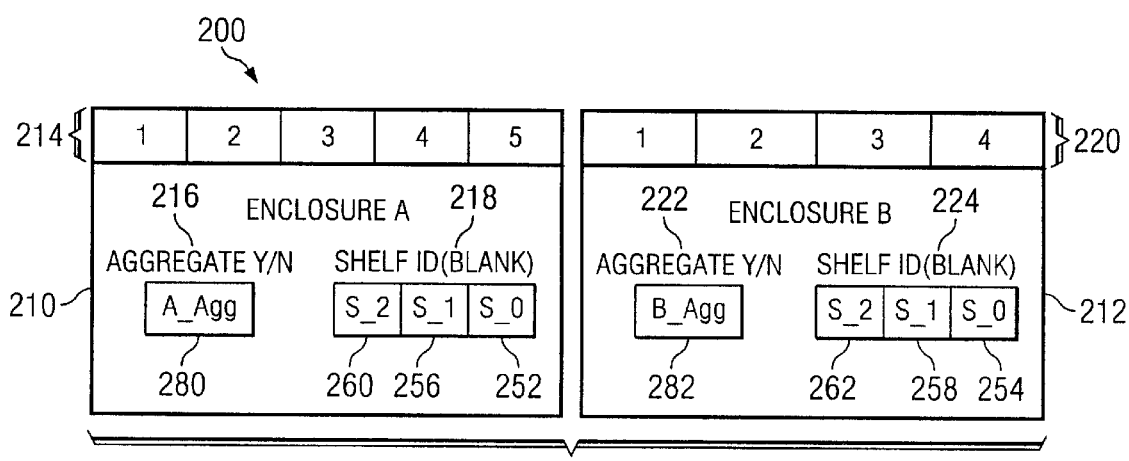
FIG. 2 shows two modular data storage enclosures with aggregation selectors according to teachings of the present disclosure.
Figure 3:
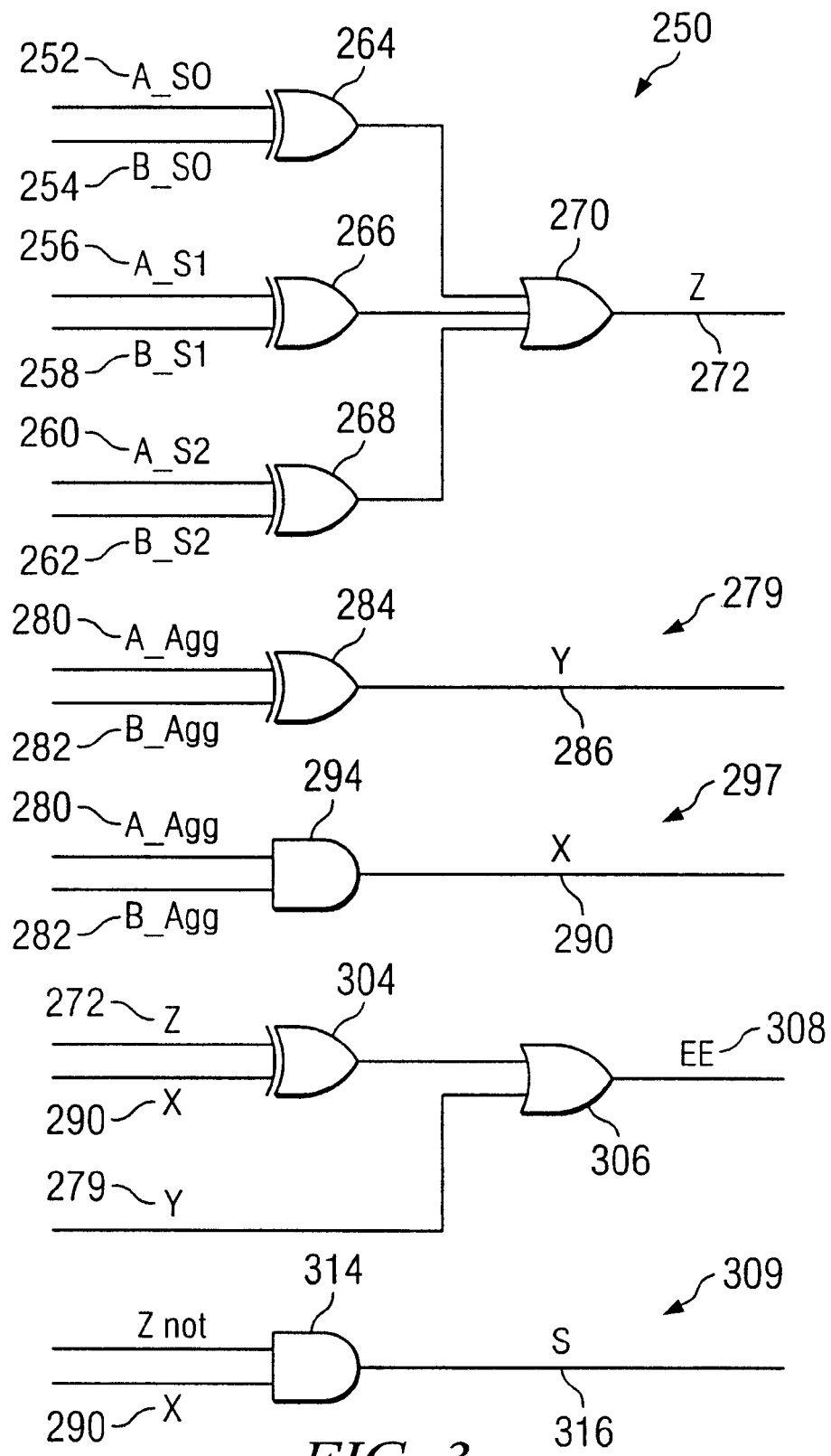
FIG. 3 shows a series of circuits for determining whether an enclosure error condition exists and for assigning fiber channel IDs to the data storage enclosures shown in FIG. 2.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentality's operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Now referring to FIG. 1, a fiber channel information handling system 100 is shown. Fiber channel information handling system 100 includes server 106 having a host bus adapter 108. Server 106 is connected with storage processor 110 which is connected to data storage enclosures 112, 114, 116, 118 and 120. In the present embodiment, data storage enclosures 116, 118 and 120 are modular data storage enclosures which may also be referred to as mini enclosures. Modular data storage enclosures are less than a full shelf width such that two or more modular data storage enclosures may be disposed on the same rack shelf. Storage processor 110 and data storage modules 112, 114, 116, 118 and 120 are connected via fiber channel loop connectors 121. Loop connectors 121 may be copper cables such as DB-9 or HSSD connectors, Fiber Optic Cable Connectors, multimode cable, single mode cable or any other cabling suitable for connecting an FC loop.

Storage processor 110 includes identification engine (ID engine) 122 and aggregation control module 124. ID engine 122 is preferably operable to assign device addresses to associated storage devices 112, 114, 116, 118 and 120. Aggregation control module 124 is preferably operable to detect whether the associated storage enclosures 112, 114, 116, 118 and 120 have been selected for aggregation and may selectively aggregate the shelf IDs of data storage modules that have been selected for aggregation.

First data storage module (DSM) 112 may also be referred to as a multi-drive storage module data storage enclosure or storage enclosure. First DSM 112 includes slots for a plurality of devices 130. DSM 112 preferably utilizes a backplane with a built in Fiber Channel loop. At each device slot 130 in the backplane loop, a port bypass circuit may preferably permit so called hot-swapping of storage disks. If a storage disk is not present in a device slot 130, the port bypass circuit automatically closes the loop. When a storage disk is inserted, the loop is opened to accommodate the storage disk.

In the present embodiment, DSM 112 includes space for 16 devices 130 (such as storage disks including Fiber Channel disks). DSM 112 also includes an associated shelf ID 132 and an aggregation selector 134. Shelf ID 132 may be preferably selected via a shelf ID selector or similar device. In some embodiments, the shelf selector may allow a user to select up to eight shelf IDs. The present disclosure also contemplates shelf ID selectors that allow for more than 6 shelf IDs. Aggregation selector 134 is preferably a button, switch, jumper or other indicator suitable to indicate that DSM 112 has been selected for aggregation of device addresses.

In the present embodiment, shelf ID 132 is selected with a shelf ID of zero (0) and aggregation selector 134 is selected such that DSM 112 is not to be aggregated. In some alternate embodiments, full-sized enclosures such as enclosures 112 and 114 may be added that do not include an aggregation selector and the present. disclosure contemplates FC systems are made up of enclosures that include an aggregation selector and that do not.

Second data storage module 114 includes a plurality of devices 138, shelf ID 140 and an aggregation selector 142. In the present embodiment, shelf ID 140 is selected with a shelf ID of one (1) and an aggregation selector 142 is selected such that DSM 114 is not selected for aggregation.

Modular data storage module 116 also known as a mini enclosure includes a limited number of associated devices 150. In the present embodiment, four storage drives labeled 0–3 are associated with modular DSM 116. Modular DSM 116 also includes shelf ID 152 and an aggregation selector 154.

Modular data storage module 118 includes storage disks 116, shelf ID 162 and an aggregation selector 164. Similarly, modular data storage module 120 includes a limited number of storage disks 170, shelf ID 172 and aggregation selector 174. Shelf IDs 152, 162 and 172 may be selected with a selection knob or other suitable selector. Aggregation selectors 154, 164 and 174 may be buttons, switches, jumpers or other suitable selectors.

In the present embodiment modular data storage modules 116 and 118 each have been selected for aggregation via aggregation selectors 154 and 164, respectively. Accordingly, modular data storage modules 116 and 118 both have been set to have the same shelf ID (shelf IDs 152 and 162). In the present embodiment, modular DSMs 116 and 118 have been aggregated. As depicted, aggregation indicators 154 and 164 of modular DSMs 116 and 118, respectively, have been selected for aggregation. Accordingly, the associated devices of modular DSMs 116 and 118 have been sequentially addressed by storage processor 110. Specifically, devices 150 of modular DSM 116 have been assigned disk drive IDs 0, 1, 2, and 3 with a corresponding shelf ID of two (2). Also, the devices 160 of modular DSM 118 have been assigned disk drive IDs for 5, 6 and 7 with a shelf ID of two (2).

Also in the present embodiment, modular data storage module 120 has not been selected for aggregation as indicated by aggregation selector 174.

Now referring to FIG. 2, two modular data storage enclosures, 210 and 212, are shown. Enclosure A 210 includes plurality of associated devices 214, aggregation selector 216 and shelf ID 218. Enclosure B 212 includes number of disks 220, aggregation selector 222 and a shelf ID of 224. In the present preferred embodiment, shelf IDs 218 and 224 are both three bit shelf IDs, made up of first bits 252 and 255, second bits 256 and 258, and third bits 260 and 262, respectively. Also in the present embodiment, aggregation indicators 216 and 222 hold single bits of aggregation selection data 280 and 282, respectively.

Now referring to FIG. 3, portions of logic diagram circuit according to teachings of the present disclosure are shown. The logic diagrams show five exemplary operations 250, 279, 289, 297 and 309. In particular, FIG. 3 shows how the shelf ID and aggregation selection data of enclosures 210 and 212 (as shown in FIG. 2) may be evaluated by an aggregation control module 124 (as shown in FIG. 1). In a preferred embodiment, circuit portions 250, 279, 289, 297 and 309 are unified in a single circuit. The circuit portions depicted are exemplary and the present disclosure contemplates alternate circuit designs to accomplish similar functions known to those of ordinary skill.

Logic circuit portion 250 is used to determine whether shelf IDs of various enclosures are different. In circuit 250, xor gate 264 receives inputs 252 and 254. Input 252 is the first bit of shelf ID 218 of enclosure 210 and input 254 is the first bit of the shelf ID 224 of enclosure 212 (as shown in FIG. 2). The output of xor gate is received by or gate 270. Xor gate 266 receives inputs 256 and 258. These inputs reflect the second bits of shelf IDs 218 and 224, respectively. The output of xor gate 266 is also received by or gate 270. Xor gate 268 receives inputs 260 and 262 which represent the third bits of shelf IDs 218 and 224. The output of xor gate 268 is received by or gate 270. Accordingly, or gate 270 receives the output of xor gates 264, 266 and 268. Or gate 270 produces output Z 272. Z 272 is an indicator of whether or not the shelf IDs of enclosures 210 and 212 are the same or different. In the present embodiment, if enclosures 210 and 212 have different shelf IDs, Z 272 will be assigned a value of one (1). If enclosures 210 and 212 have the same shelf ID, Z will be assigned a value of zero (0).

Circuit portion 279 determines whether aggregation signals of enclosures A 210 and B 212 are mismatched. Xor gate 284 receives inputs 280 and 282. Input 280 is the aggregation selection of aggregation indicator 216 and input 282 is the aggregation selection of aggregation selector 222. The output of xor gate 284 is Y 286. If the aggregation signals of enclosures 210 and 212 are mismatched, that is, if they are not the same value, output Y 286 is equal to one (1). If the aggregation signals match, then Y 286 is assigned a value equal to zero (0).

Logic circuit 289 determines whether both enclosures 210 and 212 have been selected to aggregate. And gate 294 receives inputs 280 and 282 (similar to the inputs of circuit portion 279). The output of and gate 294 is X 296. X 296 has a value of one (1) where both enclosures 210 and 218 have been selected for aggregation; X 296 has a value of zero (0) where enclosures 210 and 212 have not been selected for aggregation.

Circuit portion 297 determines whether an enclosure error occurs. Xor gate 304 receives inputs 272 and 296. Input 272 is output Z as described above with respect to circuit portion 250. Input 296 is equal to the output X of circuit 289. The output of xor gate 304 is an input for or gate 306. The other input of or gate 306 is 286 (the y variable determined in circuit portion 27). The output of or gate 306 is ee 308. In the present embodiment an error will be indicated (EE 308 is activated) where: (1) different shelf IDs and active aggregation signal exists, (2) the same shelf ID and no aggregation signal exists, or (3) where mismatch aggregation signals from the two enclosures are detected.

Circuit portion 309 determines how to proceed with fiber channel identification number assignments. Circuit 309 includes and gate 314 that receives inputs Znot 310 and X 296. Input 310 is equal to the negative of the variable Z 272. The output of 314 is S 316. If enclosures 210 and 212 have the same shelf IDs, s is assigned a value of one (1). If enclosures 210 and 212 do not have the same shelf IDs, S 316 is assigned a value of zero (0). Where the enclosures 210 and 212 are determined to have the same shelf IDs (where S is equal to 1) and no other errors are detected, the ID engine 122 (as shown in FIG. 1) will act to give the devices 214 of enclosure 210 the first sequential SCSI IDs. The ID engine will then assign the next sequential SCSI IDs to devices 220.

In operation, when an FC information handling system or FC loop is assembled or when a new enclosure is added to an existing loop, an operator will preferably assign the enclosure a shelf ID and select whether or not to aggregate the enclosure. The aggregation control module 124 then acts to determine which enclosures may be aggregated. After selecting which enclosures may be aggregated, ID engine 122 assigns sequential SCSI IDs to the enclosures that have been both selected for aggregation and also have been given the same shelf ID. In instances where an aggregation error is detected by aggregation control module 124, the operator may then be alerted to investigate and correct the detector aggregation error.

Although the disclosed embodiments have been described in detail, it should be understood that various changes, substitutions and alterations can be made to the embodiments without departing from their spirit and scope.

What is claimed is:

1. A modular fiber channel information handling system comprising:

a storage processor having an identification engine operable to assign a device address to associated storage devices;

a plurality of associated fiber channel data storage enclosures, each having a plurality of device slots;

a fiber channel storage loop connecting the plurality of fiber channel data storage enclosures with the storage processor;

the plurality of associated fiber channel data storage enclosures including at least one modular data storage enclosure having a fractional shelf width and having an associated shelf ID and an aggregation selector; and the storage processor having an aggregation engine operable to selectively aggregate the shelf IDs of aggregated data storage modules.

2. The information handling system of claim 1 wherein each data storage enclosure further comprises a shelf ID selector.

3. The information handling system of claim 1 further comprising at least two modular data storage enclosures.

4. The information handling system of claim 1 wherein the aggregation selector is selected from the group consisting of a button, a switch, and a jumper.

5. The information handling system of claim 1 further comprising:

the aggregation engine operable to detect the status of the aggregation selector; and the identification engine operable to assign device addresses the associated device slots of the modular data storage enclosures selected for aggregation.

6. The information handling system of claim 1 further comprising the aggregation engine operable to check the status of the aggregation selector of each associated data storage module and determine whether an error condition exists.

7. The information handling system of claim 6 further comprising the aggregation engine further operable to generate an error signal in response to a detected error condition.

8. The information handling system of claim 6 wherein the error condition further comprises an aggregation error condition.

9. The information handling system of claim 1 wherein the shelf ID comprises a three bit shelf ID.

10. A method for aggregating shelf IDs of data storage modules in a fiber channel storage loop comprising:

providing at least two modular data storage enclosures, each data storage enclosure having an aggregation selector;

providing a storage processor having an identification engine and an aggregation engine; and associating the storage processor and the storage modules via a fiber channel storage loop.

11. The method of claim 10 further comprising selectively aggregating the shelf IDs of aggregated data storage modules.

12. The method of claim 10 further comprising activating the aggregation selector for each data storage module selected for aggregation.

13. The method of claim 10 further comprising determining whether an aggregation error condition has been determined.

14. The method of claim 13 further comprising sending an error signal if an error condition has been determined.

* * * * *